(12) United States Patent
Downes et al.

(10) Patent No.: US 12,000,486 B2
(45) Date of Patent: Jun. 4, 2024

(54) SEAL AND METHOD OF MAKING AND USING THE SAME

(71) Applicant: SAINT-GOBAIN PERFORMANCE PLASTICS CORPORATION, Solon, OH (US)

(72) Inventors: Michael D. Downes, Kirkland, WA (US); Colby Stark, Irvine, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/937,015

(22) Filed: Sep. 30, 2022

(65) Prior Publication Data

US 2023/0107265 A1 Apr. 6, 2023

Related U.S. Application Data

(60) Provisional application No. 63/261,960, filed on Oct. 1, 2021.

(51) Int. Cl.
*F16J 15/32* (2016.01)
*F16J 15/3208* (2016.01)
*F16J 15/3236* (2016.01)

(52) U.S. Cl.
CPC ....... *F16J 15/3236* (2013.01); *F16J 15/3208* (2013.01)

(58) Field of Classification Search
CPC .... F16J 15/3204; F16J 15/441; F16J 15/3208; F16J 15/3236; F16J 15/3212
See application file for complete search history.

(56) References Cited

U.S. PATENT DOCUMENTS

| 2,279,238 | A | * | 4/1942 | Larson | F16J 15/3204 |
| | | | | | 92/204 |
| 2,564,070 | A | * | 8/1951 | Krug | F16J 15/38 |
| | | | | | 277/394 |
| 2,998,987 | A | | 9/1961 | Taschenberg et al. | |
| 3,124,365 | A | | 3/1964 | Wright | |
| 3,355,178 | A | | 11/1967 | James | |

(Continued)

FOREIGN PATENT DOCUMENTS

| EP | 3290756 A1 | 3/2018 |
| GB | 591522 A | 8/1947 |

(Continued)

OTHER PUBLICATIONS

International Search Report and Written Opinion for PCT Application No. PCT/US2022/077344, dated Jan. 26, 2023, 10 pages.

(Continued)

*Primary Examiner* — Eugene G Byrd
*Assistant Examiner* — L. Susmitha Koneru
(74) *Attorney, Agent, or Firm* — Abel Schillinger, LLP; Ann Palma (57) ABSTRACT

A seal including: an annular jacket including a body including a first lip and a second lip defining an annular recess; a circumferential spring disposed within the annular recess adjacent to one of the first lip and the second lip; and a floating circumferential insert, where a radial biasing force on the first lip is decoupled from a radial biasing force on the second lip.

18 Claims, 2 Drawing Sheets

(56) References Cited

U.S. PATENT DOCUMENTS

| | | | |
|---|---|---|---|
| 3,389,916 A | 6/1968 | Wahl et al. | |
| 3,761,100 A * | 9/1973 | Taylor | F16J 15/38 |
| | | | 277/394 |
| 4,103,909 A | 8/1978 | Hoffman et al. | |
| 4,278,218 A | 7/1981 | Klaus-Juergen | |
| 4,348,031 A | 9/1982 | Johnston et al. | |
| 4,462,600 A | 7/1984 | Johnston | |
| 5,799,953 A | 9/1998 | Henderson et al. | |
| 5,984,316 A | 11/1999 | Balsells | |
| 5,992,856 A * | 11/1999 | Balsells | F16J 15/3212 |
| | | | 277/564 |
| 6,641,141 B2 | 11/2003 | Schroeder | |
| 7,857,320 B1 | 12/2010 | Chang | |
| 8,052,152 B2 | 11/2011 | Sedlar et al. | |
| 10,415,413 B2 | 9/2019 | Chuong et al. | |
| 10,598,241 B2 | 3/2020 | Poon et al. | |
| 10,989,305 B2 | 4/2021 | Balsells | |
| 2002/0163136 A1 | 11/2002 | Schroeder | |
| 2012/0313327 A1 | 12/2012 | Castleman et al. | |
| 2014/0291936 A1 | 10/2014 | Grimanis et al. | |
| 2016/0319936 A1 | 11/2016 | Dubois | |
| 2017/0261108 A1 | 9/2017 | Soler et al. | |
| 2018/0112778 A1 | 4/2018 | Dilmaghanian et al. | |
| 2020/0208743 A1 | 7/2020 | Duong et al. | |
| 2023/0109363 A1 * | 4/2023 | Armitage | F16J 15/3232 |
| | | | 277/562 |

FOREIGN PATENT DOCUMENTS

| | | |
|---|---|---|
| GB | 874010 A | 8/1961 |
| GB | 1017476 A | 1/1966 |
| JP | 2005257051 A | 9/2005 |
| JP | 6471001 B2 | 2/2019 |
| WO | 2023056416 A1 | 4/2023 |
| WO | 2023060042 A1 | 4/2023 |

OTHER PUBLICATIONS

International Search Report and Written Opinion for PCT Application No. PCT/US2022/077470, dated Jan. 27, 2023, 10 pages.

* cited by examiner

SEAL AND METHOD OF MAKING AND USING THE SAME

CROSS-REFERENCE TO RELATED APPLICATION(S)

This application claims priority under 35 U.S.C. § 119(e) to U.S. Provisional Application No. 63/261,960, entitled "SEAL AND METHOD OF MAKING AND USING THE SAME," by Michael D. DOWNES et al., filed Oct. 1, 2021, which is assigned to the current assignee hereof and incorporated herein by reference in its entirety.

FIELD OF THE DISCLOSURE

The present disclosure relates to seals, and more particularly to annular seals, or seals adapted to be disposed to pressure conditions.

RELATED ART

Seals are employed in environments to segregate fluids (liquids, gases, slurries, etc.) from one another. Often, these seals may include springs, which repeatedly compress and expand under high pressure conditions or vibrations. Often, these springs may fracture over time, resulting in the overall seal becoming ineffective in use. The industry continues to demand improved seals capable of withstanding high pressure and high vibration conditions while maintaining operational effectiveness and avoid seal failure over time.

SUMMARY

Aspects of embodiments herein may include a seal assembly including an annular jacket including a body including a first lip and a second lip defining an annular recess; a circumferential spring disposed within the annular recess adjacent to one of the first lip and the second lip; and a floating circumferential second circumferential insert, where a radial biasing force on the first lip may be decoupled from a radial biasing force on the second lip.

Aspects of embodiments herein may include a seal assembly including: a shaft; a housing; and a seal disposed radially between the shaft and the housing, the seal including: an annular jacket including a body including a first lip and a second lip defining an annular recess; a circumferential spring disposed within the annular recess adjacent to one of the first lip and the second lip; and a floating circumferential second circumferential insert, where a radial biasing force on the first lip may be decoupled from a radial biasing force on the second lip.

Aspects of embodiments herein may include a seal including: an annular jacket including a body including a first lip and a second lip defining an annular recess; a circumferential spring disposed within the annular recess adjacent to one of the first lip and the second lip; a floating circumferential second circumferential insert; and a second circumferential insert disposed within the annular recess adjacent to the other of the first lip and the second lip.

BRIEF DESCRIPTION OF THE DRAWINGS

Embodiments are illustrated by way of example and are not intended to be limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

Figure 1A:
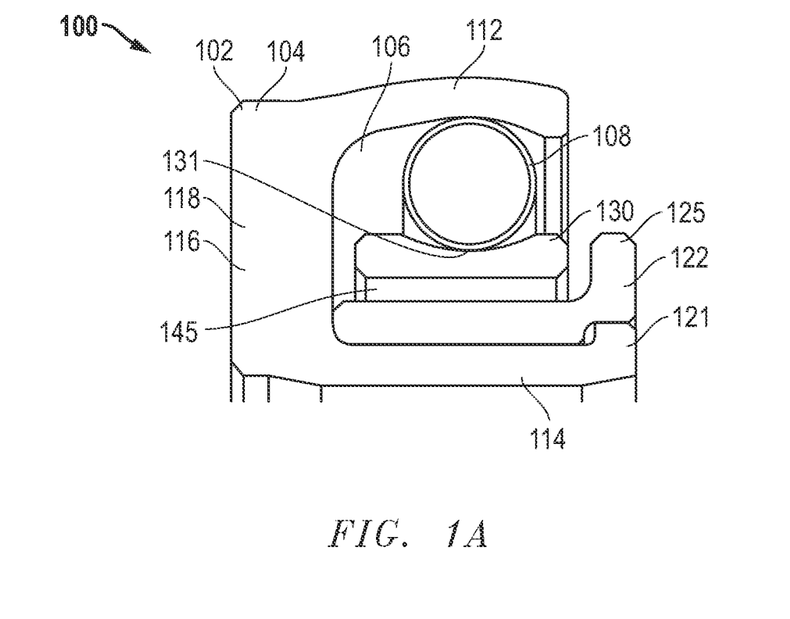
FIG. 1A includes a cross-sectional perspective view of a seal in accordance with an embodiment.

FIG. 1A includes a cross-sectional perspective view of a seal in accordance with an embodiment. Referring initially to FIG. 1A, a seal 100 in accordance with some embodiments described herein can generally include a jacket 102, a spring 108, a floating insert 130 and a second circumferential insert 122. The jacket 102 can include a body 104 having a heel 116, a first lip 112, and a second lip 114 defining an annular recess 106. In a number of embodiments, a spring 108 can be disposed within the annular recess 106. Further, in a number of embodiments, a second circumferential insert 122 can be disposed within the annular recess 106.

Upon a loading condition such as those exhibited in high pressure applications, the spring 108 may deform in at least one of an axial or radial direction of the seal 100 so as to contact or even push against a lip 112, 114 of the jacket 102. The opposite end of the spring 108 may simultaneously be biased by the floating insert 130 and even further bias at least one of the lips 112, 114. Further, the second circumferential insert 122 may deform in at least one of an axial or radial direction of the seal 100 so as to contact or even push against the other lip 112, 114 of the jacket 102. Therefore, the lips 112, 114 may provide an outward force against a neighboring first and second member respectively within an assembly. Meanwhile, the lips 112 and 114, compressed between the first and second member, may bias the spring 108 and second circumferential insert 122 in a direction transverse to the axial height of the seal 100, thus generating generally four biasing force directions, two inward axial forces and two opposing outward axial forces. The force provided by the spring 108 and floating insert 130 on either lip 112, 114 may be different than the force provided by the second circumferential insert 122 on the other of the lips 112, 114. Therefore, the force on either lip 112, 114 may be decoupled from the force on the other of the lips 112, 114. In other words, each lip 112, 114 may be biasing independently of the other within an assembly. Further, due to a void between the second circumferential insert 122 and the other components of the seal 100, the spring 108 may be isolated and not compressed and stressed more than its initial installed condition, reducing fatigue failure. It is noted that the biasing forces described may be indirectly loaded against the spring in particular applications.

The seal 100 (including at least one of the jacket 102, the spring 108, the floating insert 130, or the second circumferential insert 122) can be formed from any suitable material in the sealing arts. In a particular embodiment, the seal 100 (including at least one of the jacket 102, the spring 108, a floating insert 130, or the second circumferential insert 122) can at least partially include a polymer. The polymer may be selected from the group including a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polypropylene (PP), polycarbonate (PC), Acrylonitrile butadiene styrene (ABS), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. The polymer may be a thermoplastic or thermosetting polymer. In an embodiment, the jacket 102 may include, or even consist essentially of, a fluoropolymer. Exemplary fluoropolymers include a polytetrafluoroethylene (PTFE), a polyimide (PI), a polyamide-imide (PAI), a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Other fluoropolymers, polymers, and blends may be included in the composition of the jacket 102. In another particular embodiment, the seal 100 (including at least one of the jacket 102, the spring 108, a floating insert 130, or the second circumferential insert 122) can at least partially include, or even consist essentially of, a polyethylene (PE) such as an ultra-high-molecular-weight polyethylene (UHMWPE). In another particular embodiment, the seal 100 (including at least one of the jacket 102, the spring 108, a floating insert 130, or the second circumferential insert 122) may include a thermoplastic elastomeric hydrocarbon block copolymer, a polyether-ester block co-polymer, a thermoplastic polyamide elastomer, a thermoplastic polyurethane elastomer, a thermoplastic polyolefin elastomer, a thermoplastic vulcanizate, an olefin-based co-polymer, an olefin-based ter-polymer, a polyolefin plastomer, or combinations thereof. In an embodiment, the seal 100 (including at least one of the jacket 102, the spring 108, a floating insert 130, or the second circumferential insert 122) may include a styrene based block copolymer such as styrene-butadiene, styrene-isoprene, blends or mixtures thereof, and the like. Exemplary styrenic thermoplastic elastomers include triblock styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-butadiene-styrene (SEEBS), styrene-ethylene-ethylene-propylene-styrene (SEEPS), styrene-isoprene-butadiene-styrene (SIBS), or combinations thereof. Commercial examples include some grades of Kraton™ and Hybrar™ resins. In an embodiment, the seal 100 (including at least one of the jacket 102, the spring 108, a floating insert 130, or the second circumferential insert 122) may include an elastomer including at least one of Acrylonitrile-Butadiene (NBR) Carboxylated Nitrile (XNBR) Ethylene Acrylate (AEM, Vamac®), Ethylene Propylene Rubber (EPR, EPDM), Butyl Rubber (IIR), Chloroprene Rubber (CR), Fluorocarbon (FKM, FPM), Fluorosilicone (FVMQ), Hydrogenated Nitrile (HNBR), Perfluoroelastmer (FFKM), Polyacrylate (ACM), Polyurethane (AU, EU), Silicone Rubber (Q, MQ, VMQ, PVMQ), Tetrafluoroethylene-Propylene (AFLAS®) (FEPM).

In an embodiment, the seal 100 (including at least one of the jacket 102, the spring 108, a floating insert 130, or the second circumferential insert 122) can be treated, impregnated, filled, or coated with a lubricious material. Exemplary lubricious materials include molybdenum disulfide, tungsten disulfide, graphite, grapheme, expanded graphite, boron nitrate, talc, calcium fluoride, or any combination thereof. Additionally, the lubricious material can include alumina, silica, titanium dioxide, calcium fluoride, boron nitride, mica, Wollastonite, silicon carbide, silicon nitride, zirconia, carbon black, pigments, or any combination thereof.

In an embodiment, the seal 100 (including at least one of the jacket 102, the spring 108, a floating insert 130, or the second circumferential insert 122) can at least partially include a metal. According to certain embodiments, the metal may include iron, copper, titanium, tin, aluminum, alloys thereof, or may be another type of metal. In an embodiment, the seal 100 (including at least one of the jacket 102, the spring 108, a floating insert 130, or the second circumferential insert 122) can include a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof.

The seal 100 may have an inner diameter of between 0.254 mm and 25,000 mm. The seal 100 may have an outer diameter of between 0.5 mm and 40,000 mm. The seal 100 may have a height of between 0.24 mm and 40,000 mm.

As stated above, the seal 100 may include a jacket 102. The jacket 102 may include a plurality of lips 112, 114 defining an annular recess 106. In a particular instance, the lips 112 and 114 can extend from the heel 116 of the body 104. In a particular embodiment, the lips 112 and 114 can extend from the heel 116 in a generally same direction relative to one another. In an embodiment, the first lip 112 may be located radially exterior to the second lip 114. In an embodiment, the first lip 112 may be located radially interior to the second lip 114. In another particular embodiment, the lips 112 and 114 can extend parallel with respect to one another. In an optional embodiment, either or both of the lips 112 and 114 can include a skived lip (not illustrated) adapted to provide a scraper interface for sealing abrasive or viscous material, or environmental components such as dirt, debris, and environmental fluids. In a particular embodiment, the heel 116 can include a flange (not illustrated) which can be secured to a hardware (e.g., a valve housing or a shaft) to prevent the seal 100 from turning relative to the hardware within an assembly.

In an embodiment, at least one of the lips 112 and 114 can be generally planar extending from the heel 116. In an embodiment, at least one of the lips 112 and 114 can include a radial bulge extending outward from the respective lip 112 or 114 in a direction away from the annular recess 106. The radial bulge may extend around an entire circumference of the seal 100. Similar to the skived lip described above, the radial bulge may prevent ingress or egress of materials while exhibiting lower frictional drag. In another embodiment, one of the lips 112 or 114 can include a skived lip and the other lip 112 or 114 can include a radial bulge.

As illustrated, the lips 112 and 114 of the jacket 102 can bow outward after installation of the seal components. After installation of the spring 108, at least one of the lips 112 and 114 can include an arcuate portion as viewed in cross section, biased outward by a radial biasing force provided by the spring 108 or the second circumferential insert 122. After installation of the seal components, at least one of the lips 112 and 114 can be rectilinear or planar as viewed in cross section, biased outward by a radial biasing force provided by the spring 108 or the second circumferential insert 122.

In an embodiment, at least one of the first lip 112 or the second lip 114 may include a radially oriented flange 121. In some embodiments, the radially oriented flange 121 may be arcuate as viewed in cross section. In some embodiments, the radially oriented flange 121 may be rectilinear or planar as viewed in cross section. The radially oriented flange 121 may include radial edges on the inside of the flange within the annular recess 106.

In an embodiment, the heel 116 may have approximately the same thickness, as measured in an axial direction of the seal 100, as a thickness of the lips 112 and 114 in a radial direction. In another embodiment, the heel 116 may have an extended thickness. That is, the heel 116 can have a width, as measured from the annular recess 106 to a back surface 118 of the jacket 102, that is at least 20% the diameter of the spring 108, such as at least 30% the diameter of the spring, at least 40% the diameter of the spring, at least 50% the diameter of the spring, at least 60% the diameter of the spring, at least 70% the diameter of the spring, at least 80% the diameter of the spring, at least 90% the diameter of the spring, or even at least 100% the diameter of the spring. In another embodiment, the heel 116 can have a width of no greater than 100000% the diameter of the spring 108.

In an embodiment, the back surface 118 of the seal 100 can be generally rectilinear or planar. That is, the back surface 118 may lie generally along a plane with minimal surface undulation and deviation. In a more particular embodiment, the back surface 118 of the jacket 102 can be planar. As described in greater detail below, the planar, or generally planar, back surface 118 may facilitate improved contact between adjacent seals thereby providing a better sealing characteristic.

As shown in FIG. 1A, the spring 108 can be disposed at least partially within the annular recess 106 of the jacket 102. The spring 108 may be a circumferential spring oriented circumferentially in the annular recess 106 of the jacket 102. In an embodiment, the spring 108 may be disposed along, adjacent, or directly adjacent to the first lip 112. In an embodiment, the spring 108 may be disposed along, adjacent, or directly adjacent to the second lip 114. In an embodiment, as shown in FIG. 1A, the spring 108 may be a spring located directly adjacent to the first lip 112 within the recess 106 of the jacket 102.

In an embodiment, the spring 108 may have a diameter less than 150% the depth of the annular recess 106, such as less than 100% of the depth of the annular recess 106, or even less than 75% of the depth of the annular recess 106. In an embodiment, the diameter of the spring 108 can be no less than 10% of the depth of the annular recess 106.

The spring 108 may be arcuate as viewed in cross section. In some embodiments, the spring 108 may be rectilinear or planar as viewed in cross section. As shown in FIG. 1A, the spring 108 may contact at least one of the lips 112, 114 of the jacket 102. In an embodiment, the spring 108 may contact substantially the entirety of at least one of the lips 112, 114 in the axial direction. In an embodiment, the spring 108 may contact at least one of the annular flanges of the lips 112, 114 of the jacket 102. As shown in FIG. 1A, the spring 108 may contact at least one of the annular flanges 121, 123 of the lips 112, 114 of the jacket 102. In an embodiment, the spring 108 may contact substantially the entirety of at least one of the lips 112, 114 in the axial direction. The spring 108 may contact an inner axial edge of at least one of the annular flanges 121, 123 of the lips 112, 114 of the jacket 102.

As contemplated in at least one embodiment described herein, the spring 108 can include a length of material formed into a helical spring having a plurality of coils. In an embodiment, the spring 108 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. The length of material forming the spring 108 can have a polygonal or ellipsoidal cross section. For example, in an embodiment, the spring 108 can be formed from circular wire. In another embodiment, the spring 108 can be formed from a ribbon of material wound into a plurality of coils. The coils of the spring 108 can be adjacent or even partially overlap one another. In a particular instance the coils can be parallel to one another. In another instance, the coils can cant relative to each other. That is, the coils can be angularly offset and angled with respect to one another.

In the relaxed state, the spring 108 may have a generally round cross section. That is, the spring 108 may be a helical spring, as described above. In other embodiments, the spring 108 may define a generally polygonal cross-sectional profile. In a more particular embodiment, the spring 108 may have a generally T-shaped cross-sectional profile. In another embodiment, the spring 108 may have an ellipsoidal cross section. For example, in a non-illustrated embodiment, the spring 108 may have an ovular or circular cross-sectional profile. In yet a further embodiment, the cross section of the spring 108 may be partially ellipsoidal and partially polygonal. That is, the cross section of the spring 108 may have linear portions and arcuate portions. The wire forming the coil of the spring 108 may be rectangular, square, circular, elliptical, or keystone in cross section. The wire forming the coil of the spring 108 may be turned at a pitch of between 0.025 mm and 25.4 mm. The wire forming the coil of the spring 108 may have a wire diameter of between 0.025 mm and 25.4 mm. The wire forming the coil of the spring 108 may have a spring diameter of between 0.05 mm and 40,000 mm.

In an embodiment, the spring 108 may extend around the entire circumference of the seal 100. In a more particular embodiment, the spring 108 may have a uniform shape and material characteristic around the entire circumference of the seal 100. In another more particular embodiment, the spring 108 may have a varying shape or material selection around the circumference of the seal 100. In another embodiment, the spring 108 may extend around only a portion of the circumference of the seal 100. In a more particular embodiment, the spring 108 may include a plurality of springs 108 at least partially spaced apart from one another. In such embodiment, there may be a circumferential space between adjacent springs 108.

The spring 108 can at least partially include, or even consist essentially of, a metal, such as a steel, or even more particularly spring steel. The metal can be coated or surface treated to prevent corrosion or another undesirable effect from environmental exposure. In another embodiment, the spring 108 can at least partially include, or even consist essentially of, for example, Eligloy, Inconel, Hastelloy, or a combination thereof.

In yet a further embodiment, the spring 108 can include cobalt, chromium, nickel, iron, molybdenum, manganese, or a combination thereof. In a particular embodiment, the spring 108 can include at least 10 wt % of cobalt, such as at least 20 wt % of cobalt, at least 25 wt % of cobalt, at least 30 wt % of cobalt, at least 35 wt % of cobalt, or even at least 40 wt % of cobalt. The spring 108 can have a yield strength of less than 1200 MPa, such as less than 1100 MPa, less than 1000 MPa, or even less than 900 MPa. In a particular instance, the spring 108 may be heat treated or surface treated to enhance properties thereof.

The spring 108 may provide a biasing force against the jacket 102. Specifically, the spring 108 may contact at least one of the first lip 112 or the second lip 114 and provide an outwardly radial biasing force thereagainst. In a particular embodiment, the biasing force of the spring 108 against a lip 112, 114 can be at least 0.001 N/mm², such as at least 0.01 N/mm². In another embodiment, the biasing force can be less than 1000 N/mm², such as less than 500 N/mm², less than 400 N/mm², less than 300 N/mm², less than 200 N/mm², less than 100 N/mm², less than 50 N/mm², less than 25 N/mm², or even less than 10 N/mm². In a number of embodiments, the radial biasing force against the first lip 112 may be different than the radial biasing force against the second lip 114 as described in further detail below.

Upon an axial loading condition such as those exhibited in high pressure applications, the spring 108 may deform from an unloaded position to a loaded position. In an embodiment, the spring 108 may have an unloaded inner diameter, $D_U$, as measured in the relaxed state, and a minimum loaded inner dimension, $D_L$, as measured in the operational state, that are different from one another. In a particular embodiment, $D_U/D_L$ can be at least 1.01, such as at least 1.05, at least 1.1, at least 1.15, at least 1.2, or even at least 1.25. In another particular embodiment, $D_U/D_L$ can be no greater than 10.0, such as no greater than 5.0, no greater than 4.0, no greater than 3.0, no greater than 2.0, no greater than 1.75, no greater than 1.5, or even no greater than 1.3. As $D_U/D_L$ defines a ratio of spring deflection, $D_U/D_L$ may be adjusted with adjustment, shape, or material selection of the annular recess 106 or even shape, design, or material selection of the spring 108.

As shown in FIG. 1A, the seal 100 may further include a floating insert 130. In an embodiment, the floating insert 130 may extend around the entire circumference of the seal 100. In a more particular embodiment, the floating insert 130 may have a uniform shape and material characteristic around the entire circumference of the seal 100. In another more particular embodiment, the floating insert 130 may have a varying shape or material selection around the circumference of the seal 100. In another embodiment, the floating insert 130 may extend around only a portion of the circumference of the seal 100. In a more particular embodiment, the floating insert 130 may include a plurality of floating inserts 130 at least partially spaced apart from one another. In such embodiment, there may be a circumferential space between adjacent floating inserts 130.

In a particular instance, the floating insert 130 may at least partially include, or even consist essentially of, a UHMWPE or a fluoropolymer such as PTFE, or a material such as PEEK. The floating insert 130 may at least partially include, or even consist essentially of, a metal, such as a steel.

In an embodiment, the floating insert 130 can have a generally polygonal cross section. For example, the floating insert 130 may have a generally triangular cross section, a generally quadrilateral cross section, a generally pentagonal cross section, or any cross section including generally straight sidewall segments. In another embodiment, the floating insert 130 can have a generally ellipsoidal cross section. In yet a further embodiment, the floating insert 130 may have a partially polygonal and a partially ellipsoidal cross-sectional profile. That is, the floating insert 130 may have cross section with arcuate portions and straight portions. In a particular instance, the cross-sectional profile of the floating insert 130 may be uniform around the circumference of the floating insert 130. In another particular instance, the cross-sectional profile of the floating insert 130 may not be constant around the circumference of the floating insert 130. For example, the floating insert 130 may have a first cross-sectional profile at a first circumferential location and a second cross-sectional profile at a second circumferential location, wherein the first and second cross-sectional profiles are different from one another. This may be advantageous in applications where particular or uneven pressures are expected.

The floating insert 130 may have an aspect ratio, as defined by a ratio of the width of the floating insert 130 in a radial direction relative of the seal 100 to the height, of the floating insert 130 in an axial direction relative to the seal 100, or width/height. In an embodiment, the width/height of the floating insert 130 can be no greater than 1.0, such as no greater than 0.9, no greater than 0.8, no greater than 0.7, no greater than 0.6, no greater than 0.5, no greater than 0.4, no greater than 0.3, no greater than 0.25, no greater than 0.2, or even no greater than 0.15. In another embodiment, the width/height of the floating insert 130 can be no less than 0.001, such as no less than 0.01, or even no less than 0.1.

The floating insert 130 may be arcuate as viewed in cross section. In some embodiments, the floating insert 130 may be rectilinear or planar as viewed in cross section. As shown in FIG. 1A, the floating insert 130 may contact at least one of the lips 112, 114 of the jacket 102. In an embodiment, the floating insert 130 may contact substantially the entirety of at least one of the lips 112, 114 in the axial direction. In an embodiment, the floating insert 130 may contact at least one of the annular flanges 121, 123 of the lips 112, 114 of the jacket 102. As shown in FIG. 1A, the floating insert 130 may contact substantially the entirety of at least one of the annular flanges 121, 123 of the lips 112, 114 of the jacket 102. The floating insert 130 may include a second circumferential insert flange 125 that contacts at least one of the annular flanges 121, 123 of the lips 112, 114 of the jacket 102. The floating insert 130 may contact an inner axial edge of at least one of the annular flanges 121, 123 of the lips 112, 114 of the jacket 102.

In accordance with a particular embodiment, when in the relaxed state, the floating insert 130 may float within the jacket 102. That is, the floating insert 130 may be spaced apart from the inner second circumferential insert 122 and/or the jacket 102. As a result, in an embodiment, the annular recess 106 may include a void 145 between the floating insert 130 and the second circumferential insert 122. The volume of the void 145 may be at least 5%, such as at least 10%, such as at least 15%, such as at least 20%, or such as at least 25% of the volume of the annular recess 106. In another embodiment, the volume of the void 145 can be less than 50%, such as less than 45%, less than 40%, less than 30%, less than 25%, less than 20%, less than 15%, less than 10%, or even less than 5% of the volume of the annular recess 106.

In an embodiment, the floating insert 130 may be disposed to contact the spring 108 within the annular recess 106 of the jacket 102. In an embodiment, the floating insert 130 may be disposed to contact only the spring 108 within the annular recess 106 of the jacket 102. The floating insert 130 may include a seat 131 that may be designed to contact the spring 108 and provide support thereto.

By way of example, the height of the floating insert 130 may be less than 100% the diameter of the inner surface (disposed adjacent to the seat 131 of the floating insert) of the spring 108, such as less than 99% the diameter, less than 98% the diameter, less than 97% the diameter, less than 96% the diameter, less than 95% the diameter, or even less than 90% the diameter. In another embodiment, the height of the floating insert 130 may be no less than 10% the diameter of the inner surface, such as no less than 25% the diameter, or even no less than 50% the diameter.

The floating insert 130 may provide a biasing force against the spring 108. Specifically, the floating insert 130 may contact the spring 108 and provide an outwardly radial biasing force thereagainst. In a particular embodiment, the biasing force of the floating insert 130 against the spring 108 can be at least 0.001 N/mm$^2$, such as at least 0.01 N/mm$^2$. In another embodiment, the biasing force can be less than 1000 N/mm$^2$, such as less than 500 N/mm$^2$, less than 400 N/mm$^2$, less than 300 N/mm$^2$, less than 200 N/mm$^2$, less than 100 N/mm$^2$, less than 50 N/mm$^2$, less than 25 N/mm$^2$, or even less than 10 N/mm$^2$.

Still referring to FIG. 1A, the seal 100 may include a second circumferential insert 122 disposed within to the annular recess 106. The second circumferential insert 122 may be disposed along, adjacent, or directly adjacent to at least one of the radial lips 112, 114 of the annular recess 106. In an embodiment, the second circumferential insert 122 may be disposed along, adjacent, or directly adjacent to the first lip 112. In an embodiment, the second circumferential insert 122 may be disposed along the second lip 114. Specifically, the second circumferential insert 122 may form a surface of the annular recess 106.

In a particular instance, the second circumferential insert 122 may at least partially include, or even consist essentially of, a UHMWPE or a fluoropolymer such as PTFE, or a material such as PEEK. The second circumferential insert 122 may at least partially include, or even consist essentially of, a metal, such as a steel.

In an embodiment, the second circumferential insert 122 may extend around the entire circumference of the seal 100. In a more particular embodiment, the second circumferential insert 122 may have a uniform shape and material characteristic around the entire circumference of the seal 100. In another more particular embodiment, the second circumferential insert 122 may have a varying shape or material selection around the circumference of the seal 100. In another embodiment, the second circumferential insert 122 may extend around only a portion of the circumference of the seal 100. In a more particular embodiment, the second circumferential insert 122 may include a plurality of second circumferential insert 122 at least partially spaced apart from one another. In such embodiment, there may be a circumferential space between adjacent second circumferential insert 122.

In an embodiment, the second circumferential insert 122 can have a generally polygonal cross section. For example, the second circumferential insert 122 may have a generally triangular cross section, a generally quadrilateral cross section, a generally pentagonal cross section, or any cross section including generally straight sidewall segments. In another embodiment, the second circumferential insert 122 can have a generally ellipsoidal cross section. In yet a further embodiment, the second circumferential insert 122 may have a partially polygonal and a partially ellipsoidal cross-sectional profile. That is, the second circumferential insert 122 may have cross section with arcuate portions and straight portions. In a particular instance, the cross-sectional profile of the second circumferential insert 122 may be uniform around the circumference of the second circumferential insert 122. In another particular instance, the cross-sectional profile of the second circumferential insert 122 may not be constant around the circumference of the second circumferential insert 122. For example, the second circumferential insert 122 may have a first cross-sectional profile at a first circumferential location and a second cross-sectional profile at a second circumferential location, wherein the first and second cross-sectional profiles are different from one another. This may be advantageous in applications where particular or uneven pressures are expected.

The second circumferential insert 122 may have an aspect ratio, as defined by a ratio of the width of the second circumferential insert 122 in a radial direction relative of the seal 122 to the height, $H_I$, of the second circumferential insert 122 in an axial direction relative to the seal 100, or width/height. In an embodiment, the width/height of the second circumferential insert 122 can be no greater than 1.0, such as no greater than 0.9, no greater than 0.8, no greater than 0.7, no greater than 0.6, no greater than 0.5, no greater than 0.4, no greater than 0.3, no greater than 0.25, no greater than 0.2, or even no greater than 0.15. In another embodiment, the width/height of the second circumferential insert 122 can be no less than 0.001, such as no less than 0.01, or even no less than 0.1.

The second circumferential insert 122 may be arcuate as viewed in cross section. In some embodiments, the second circumferential insert 122 may be rectilinear or planar as viewed in cross section. As shown in FIG. 1A, the second circumferential insert 122 may contact at least one of the lips 112, 114 of the jacket 102. In an embodiment, the second circumferential insert 122 may contact substantially the entirety of at least one of the lips 112, 114 in the axial direction. In an embodiment, the second circumferential insert 122 may contact at least one of the annular flanges 121, 123 of the lips 112, 114 of the jacket 102. As shown in FIG. 1A, the second circumferential insert 122 may contact substantially the entirety of at least one of the annular flanges 121, 123 of the lips 112, 114 of the jacket 102. The second circumferential insert 122 may include a radially oriented second circumferential insert flange 125 that contacts at least one of the annular flanges 121, 123 of the lips 112, 114 of the jacket 102. The second circumferential insert 122 may contact an inner axial edge of at least one of the annular flanges 121, 123 of the lips 112, 114 of the jacket 102. The second circumferential insert flange 125 may have a height that may be at least 5% of the height of the second circumferential insert, such as at least 7%, such as at least 10%, such as at least 15%, or such as at least 20%.

The second circumferential insert 122 may provide a biasing force against the jacket 102. Specifically, the second circumferential insert 122 may contact at least one of the first lip 112 or the second lip 114 and provide an outwardly radial biasing force thereagainst. In a particular embodiment, the biasing force of the second circumferential insert 112 against a lip 112, 114 can be at least 0.001 N/mm², such as at least 0.01 N/mm². In another embodiment, the biasing force can be less than 1000 N/mm², such as less than 500 N/mm², less than 400 N/mm², less than 300 N/mm², less than 200 N/mm², less than 100 N/mm², less than 50 N/mm², less than 25 N/mm², or even less than 10 N/mm².

In yet a further embodiment, the second circumferential insert 122 may be disposed spaced apart from the spring 108 and/or the floating insert 130 within the annular recess 106 of the jacket 102. By way of example, the height of the second circumferential insert 122 may be less than 100% the diameter of the inner surface (disposed on the opposite side of the seat 131) of the floating insert 130, such as less than 99% the diameter, less than 98% the diameter, less than 97% the diameter, less than 96% the diameter, less than 95% the diameter, or even less than 90% the diameter. In another embodiment, the height of the second circumferential insert 122 may be no less than 10% the diameter of the inner surface, such as no less than 25% the diameter, or even no less than 50% the diameter.

Figure 1B:
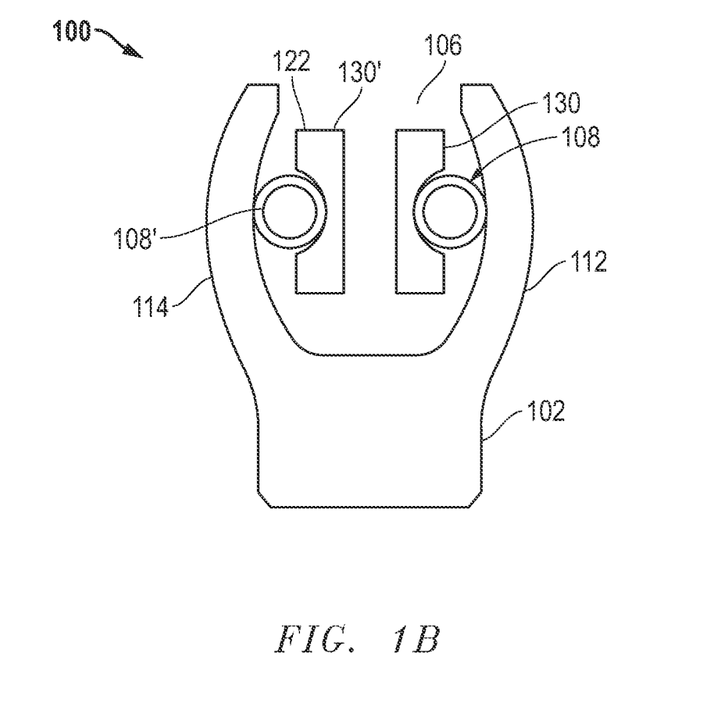
FIG. 1B includes a cross-sectional perspective view of a seal in accordance with an embodiment.

FIG. 1B includes a cross-sectional perspective view of a seal in accordance with an embodiment. The components of FIG. 1B may be the same as those described above in FIG. 1A. Referring to FIG. 1B, the second circumferential insert 122 may include a second spring 108' and a second floating insert 130'. The second spring 108' may be similar to the first spring 108 in shape, size, material, or physical characteristics as described above. The second spring 108' may be different than the first spring 108 in shape, size, material, or physical characteristics as described above. That is, the springs 108, 108' may be different from one another. However, the first or second springs 108, 108' can include any of the features described above with respect to the spring 108. For example, the first or second springs 108, 108' can at least partially include, or even consist essentially of, for example, Elgiloy, Inconel, Hastelloy, a steel, or a combination thereof. The second floating insert 130' may be similar to the first floating insert 130 in shape, size, material, or physical characteristics as described above. The second floating insert 130' may be different than the first floating insert 130 in shape, size, material, or physical characteristics as described above. That is, the floating inserts 130, 130' may be different from one another. However, the floating inserts 130, 130' can include any of the features described above with respect to the spring 108. For example, the floating inserts 130, 130' can at least partially include, or even consist essentially of, for example, a polymer such as PEEK.

Figure 2:
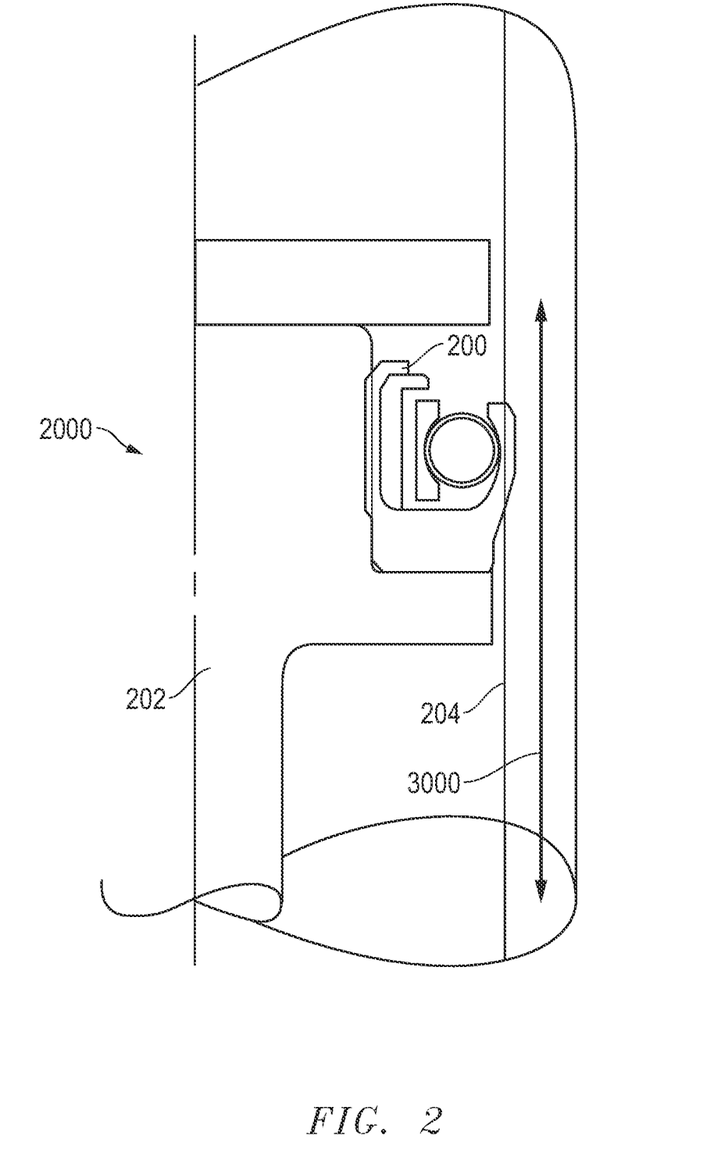
FIG. 2 includes a cross-sectional perspective view of a seal assembly in accordance with an embodiment.

FIG. 2 includes a cross-sectional perspective view of a seal within a seal assembly in accordance with an embodiment. As shown in FIG. 2, the seal 200 may be placed radially between a first member 202 and a second member 204 within a seal assembly 2000 down a central axis 3000. The first member 202 may be a shaft. The second member 204 may be a housing. At least one of the first member 202 or second member 204 may actuate relative to at least one of the seal 200 or the other of the first member 202 or second member 204. The actuation may be a rotational, radial, or axial movement. The components of the seal 200 of FIG. 2 may be the same as those described above in FIGS. 1A-1B.

The seal 100 may form an assembly which can be utilized in a bidirectional pressure application. The seal 100 may be oriented and protect against leakage of fluid in a forward axial direction, or the seal 100 may be oriented and protect against leakage of fluid in a backward axial direction down the central axis 3000. The seal 100 may be oriented and protect against leakage of fluid in an inward radial direction, or the seal 100 may be oriented and protect against leakage of fluid in an outward radial direction in a direction perpendicular to the central axis 3000. In this regard, the seal 100 may be selected to have specific characteristics which permit effective sealing in those particular orientations. Particular suitable applications include cryogenic valves, pistons, and other movable components requiring sealing therebetween.

Seals described according to embodiments herein may allow for the components of the spring to have a longer lifetime due to appropriately placed forces that lessen repeat compression and stressing of the individual components due to vibration or actuation of the seal or other components within the assembly. Further, seals described according to embodiments herein may limit the impact of offset or misalignment of the adjacent components relative to the seal within a seal assembly. As a result, the lifetime of the components and the seal itself may be improved.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1: A seal comprising: an annular jacket comprising a body comprising a first lip and a second lip defining an annular recess; a circumferential spring disposed within the annular recess adjacent to one of the first lip and the second lip; and a floating circumferential insert, wherein a radial biasing force on the first lip is decoupled from a radial biasing force on the second lip.

Embodiment 2: A seal assembly comprising: a first member; a second member; and a seal disposed radially between the first member and the second member, the seal comprising: an annular jacket comprising a body comprising a first lip and a second lip defining an annular recess; a circumferential spring disposed within the annular recess adjacent to one of the first lip and the second lip; and a floating circumferential insert, wherein a radial biasing force on the first lip is decoupled from a radial biasing force on the second lip.

Embodiment 3: A seal comprising: an annular jacket comprising a body comprising a first lip and a second lip defining an annular recess; a circumferential spring disposed within the annular recess adjacent to one of the first lip and the second lip; a floating circumferential insert; and a second circumferential insert disposed within the annular recess adjacent to the other of the first lip and the second lip.

Embodiment 4: The seal or seal assembly according to any one of embodiments 1-2, wherein the annular jacket further comprises a second circumferential insert disposed within the annular recess adjacent to the other of the first lip and the second lip.

Embodiment 5: The seal or seal assembly according to any one of the preceding embodiments, wherein the circumferential spring provides a radial biasing force against the first lip or the second lip of between 0.1 to 1000 N/mm.

Embodiment 6: The seal or seal assembly according to any one of the preceding embodiments, wherein the second circumferential insert provides a radial biasing force against the first lip or the second lip of between 0.1 to 1000 N/mm.

Embodiment 7: The seal or seal assembly according to any one of the preceding embodiments, wherein the radial biasing force against the first lip is different than the radial biasing force against the second lip.

Embodiment 8: The seal or seal assembly according to any one of the preceding embodiments, wherein the first lip is located radially exterior to the second lip.

Embodiment 9: The seal or seal assembly according to embodiment 8, wherein the second circumferential insert is disposed directly adjacent to the second lip.

Embodiment 10: The seal or seal assembly according to embodiment 8, wherein the second circumferential insert is disposed directly adjacent to the first lip.

Embodiment 11: The seal or seal assembly according to any one of the preceding embodiments, wherein the second circumferential insert comprises a metal.

Embodiment 12: The seal or seal assembly according to any one of the preceding embodiments, wherein the circumferential spring comprises a metal.

Embodiment 13: The seal or seal assembly according to any one of the preceding embodiments, wherein the second circumferential insert comprises a polymer.

Embodiment 14: The seal or seal assembly according to any one of the preceding embodiments, wherein the circumferential spring comprises a polymer.

Embodiment 15: The seal or seal assembly according to any one of the preceding embodiments, wherein the jacket comprises a metal.

Embodiment 16: The seal or seal assembly according to any one of the preceding embodiments, wherein the jacket comprises a polymer.

Embodiment 17: The seal or seal assembly according to any one of the preceding embodiments, wherein the floating circumferential insert comprises a metal.

Embodiment 18: The seal or seal assembly according to any one of the preceding embodiments, wherein the floating circumferential insert comprises a polymer.

Embodiment 19: The seal or seal assembly according to any one of the preceding embodiments, wherein at least one of the first lip or the second lip comprises a radially oriented flange.

Embodiment 20: The seal or seal assembly according to embodiment 19, wherein the second circumferential insert contacts a radial edge of the radially oriented flange of the first lip or the second lip.

Embodiment 21: The seal or seal assembly according to any one of the preceding embodiments, wherein the second circumferential insert comprises a radially oriented flange.

Embodiment 22: The seal or seal assembly according to any one of the preceding embodiments, wherein the annular recess comprises a void between the floating circumferential insert and the second circumferential insert.

Embodiment 23: The seal or seal assembly according to any one of the preceding embodiments, wherein the spring is turned at a pitch of between 0.025 mm and 25.4 mm.

Embodiment 24: The seal or seal assembly according to any one of the preceding embodiments, wherein the spring has a wire diameter of between 0.025 mm and 25.4 mm.

Embodiment 25: The seal or seal assembly according to any one of the preceding embodiments, wherein the spring has a spring diameter of between 0.05 mm and 40,000 mm.

Embodiment 26: The seal or seal assembly according to any one of the preceding embodiments, wherein the spring has a rectangular, square, or keystone cross-sectional wire.

Embodiment 27: The seal or seal assembly according to any one of the preceding embodiments, wherein the spring has a circular cross-sectional wire.

Embodiment 28: The seal or seal assembly according to any one of the preceding embodiments, wherein the seal has an inner diameter of between 0.254 mm and 25,000 mm.

Embodiment 29: The seal or seal assembly according to any one of the preceding embodiments, wherein the seal has an outer diameter of between 0.5 mm and 40,000 mm.

Embodiment 30: The seal or seal assembly according to any one of the preceding embodiments, wherein the seal has a height of between 0.24 mm and 40,000 mm.

Embodiment 31: The seal or seal assembly according to any one of the preceding embodiments, wherein the second circumferential insert comprises a second circumferential spring.

Embodiment 32: The seal or seal assembly according to any one of the preceding embodiments, wherein the floating circumferential insert contacts the circumferential spring.

Embodiment 33: The seal or seal assembly according to any one of the preceding embodiments, wherein the floating circumferential insert comprises a seat contacting the circumferential spring.

Embodiment 34: The seal or seal assembly according to embodiment 22, wherein the void has a volume of no greater than 50% of the volume of the annular recess.

Embodiment 35: The seal or seal assembly according to embodiment 22, wherein the void has a volume of no less than 5% of the volume of the annular recess.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A seal comprising:
an annular jacket comprising a body comprising a first lip and a second lip defining an annular recess;
a circumferential spring disposed within the annular recess adjacent to one of the first lip and the second lip; and
a floating circumferential insert, wherein a radial biasing force on the first lip is decoupled from a radial biasing force on the second lip, wherein the annular jacket further comprises a second circumferential insert disposed within the annular recess adjacent to the other of the first lip and the second lip, wherein the annular recess comprises a void between the floating circumferential insert and the second circumferential insert.

2. A seal assembly comprising:
a first member;
a second member; and
a seal disposed radially between the first member and the second member, the seal comprising:
an annular jacket comprising a body comprising a first lip and a second lip defining an annular recess;
a circumferential spring disposed within the annular recess adjacent to one of the first lip and the second lip; and
a floating circumferential insert, wherein a radial biasing force on the first lip is decoupled from a radial biasing force on the second lip, wherein the annular jacket further comprises a second circumferential insert disposed within the annular recess adjacent to the other of the first lip and the second lip, wherein the annular recess comprises a void between the floating circumferential insert and the second circumferential insert.

3. The seal according to claim 1, wherein the annular jacket further comprises a second circumferential insert disposed within the annular recess adjacent to the other of the first lip and the second lip.

4. The seal according to claim 1, wherein the circumferential spring provides a radial biasing force against the first lip or the second lip of between 0.1 to 1000 N/mm.

5. The seal according to claim 1, wherein the second circumferential insert provides a radial biasing force against the first lip or the second lip of between 0.1 to 1000 N/mm.

6. The seal according to claim 1, wherein the radial biasing force against the first lip is different than the radial biasing force against the second lip.

7. The seal assembly according to claim 2, wherein the first lip is located radially exterior to the second lip.

8. The seal assembly according to claim 7, wherein the second circumferential insert is disposed directly adjacent to the second lip.

9. The seal assembly according to claim 7, wherein the second circumferential insert is disposed directly adjacent to the first lip.

10. The seal according to claim 1, wherein the second circumferential insert comprises a metal.

11. The seal according to claim 1, wherein at least one of the first lip or the second lip comprises a radially oriented flange.

12. The seal according to claim 11, wherein the second circumferential insert contacts a radial edge of the radially oriented flange of the first lip or the second lip.

13. The seal according to claim 1, wherein the second circumferential insert comprises a radially oriented flange.

14. The seal according to claim 1, wherein the second circumferential insert comprises a second circumferential spring.

15. The seal according to claim 1, wherein the floating circumferential insert contacts the circumferential spring.

16. The seal according to claim 1, wherein the floating circumferential insert comprises a seat contacting the circumferential spring.

17. The seal according to claim 1, wherein the void has a volume of no greater than 50% of the volume of the annular recess.

18. The seal according to claim 1, wherein the void has a volume of no less than 5% of the volume of the annular recess.

* * * * *